US010212490B2

(12) United States Patent
Major

(10) Patent No.: US 10,212,490 B2
(45) Date of Patent: Feb. 19, 2019

(54) PRE-DISTRIBUTION IDENTIFICATION OF BROADCAST TELEVISION CONTENT USING AUDIO FINGERPRINTS

(71) Applicant: ECHOSTAR TECHNOLOGIES L.L.C., Englewood, CO (US)

(72) Inventor: Robert Drew Major, Orem, UT (US)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 0 days.

(21) Appl. No.: 13/836,688

(22) Filed: Mar. 15, 2013

(65) Prior Publication Data

US 2014/0282662 A1    Sep. 18, 2014

(51) Int. Cl.
| H04N 7/16 | (2011.01) |
| H04N 21/8358 | (2011.01) |
| H04N 21/233 | (2011.01) |
| H04N 21/44 | (2011.01) |
| H04N 21/81 | (2011.01) |
| H04N 21/8352 | (2011.01) |
| H04N 21/845 | (2011.01) |

(52) U.S. Cl.
CPC ....... *H04N 21/8358* (2013.01); *H04N 21/233* (2013.01); *H04N 21/44016* (2013.01); *H04N 21/812* (2013.01); *H04N 21/8352* (2013.01); *H04N 21/8456* (2013.01)

(58) Field of Classification Search
CPC ............ H04N 21/00; H04N 21/44008; H04N 21/812; H04N 21/435; H04N 21/4722; H04N 21/8358; H04N 21/4394
See application file for complete search history.

(56) References Cited

U.S. PATENT DOCUMENTS

| 5,978,791 A | 11/1999 | Farber et al. |
| 6,263,503 B1 | 7/2001 | Margulis |
| 6,928,442 B2 | 8/2005 | Farber et al. |
| 6,968,337 B2 | 11/2005 | Wold |
| 7,500,007 B2 | 3/2009 | Ikezoye et al. |
| 7,529,659 B2 | 5/2009 | Wold |
| 7,562,012 B1 | 7/2009 | Wold et al. |
| 7,707,614 B2 | 4/2010 | Krikorian et al. |

(Continued)

OTHER PUBLICATIONS

Audible Magic Corporation, White Paper, Digital Fingerprinting & Video Content Recognition Enabling New Forms of Interactive Advertising, Jun. 7, 2011.

(Continued)

*Primary Examiner* — Samira Monshi
(74) *Attorney, Agent, or Firm* — Lorenz & Kopf, LLP

(57) ABSTRACT

Systems, devices and methods are provided to automatically identify advertisements or other portions of a broadcast television stream before the stream is distributed via a cable, DBS, IPTV or other medium. The television broadcast is received at the data processing system, and audio content of the television broadcast is analyzed to generate an audio fingerprint of a portion of the audio content. The identified audio fingerprint are compared to audio fingerprints stored in a database to thereby identify the portion of the television broadcast based on the generated audio fingerprint. By identifying the contents of an actual broadcast prior to redistribution of the broadcast, additional actions may be taken that are unique to the identified content.

16 Claims, 3 Drawing Sheets

(56) References Cited

U.S. PATENT DOCUMENTS

Figure 1:
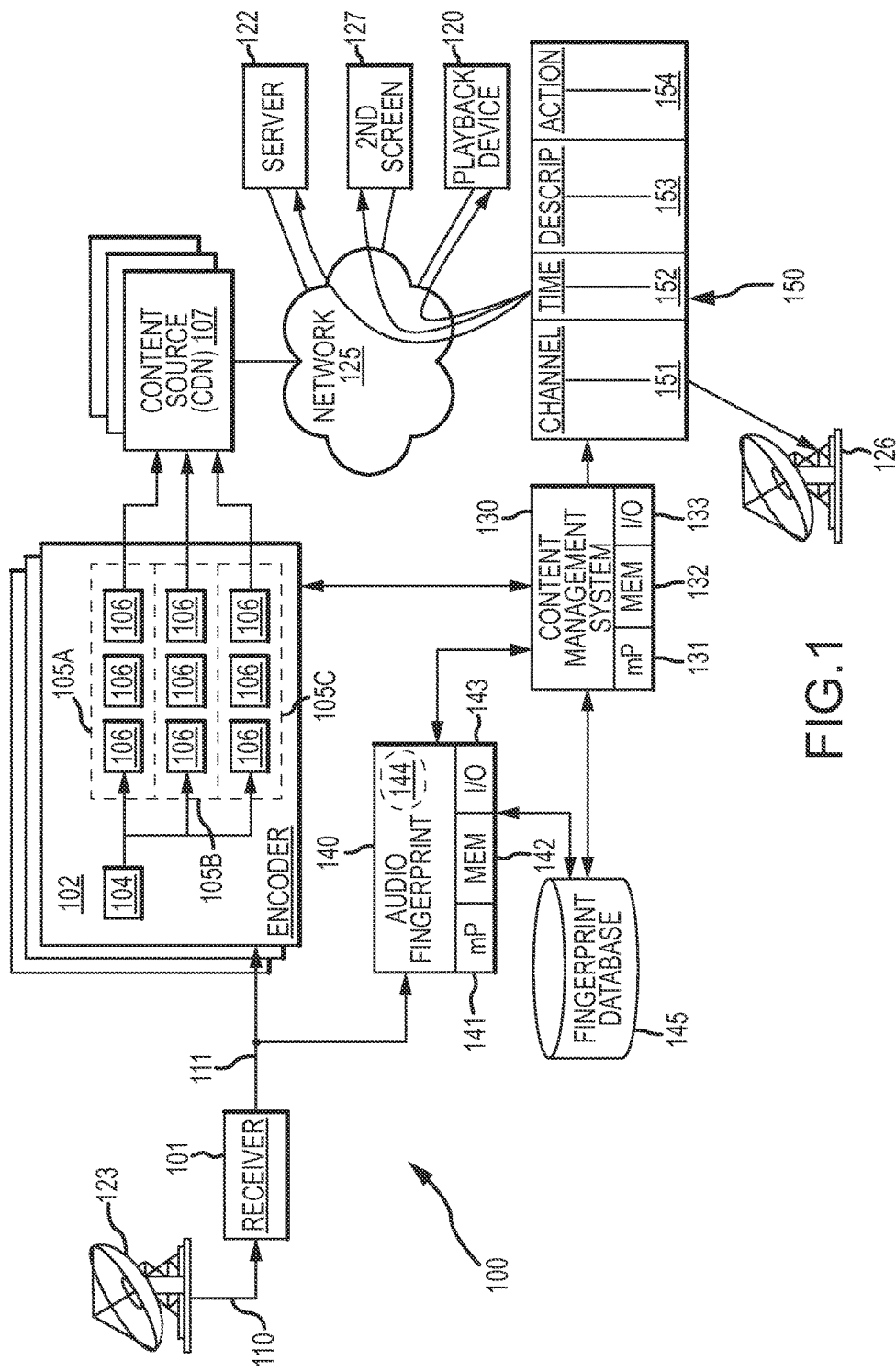

| | | | |
|---|---|---|---|
| 7,797,249 B2 | 9/2010 | Schmelzer et al. | |
| 7,818,444 B2 | 10/2010 | Brueck et al. | |
| 7,877,438 B2 | 1/2011 | Schrempp et al. | |
| 7,877,776 B2 | 1/2011 | Krikorian et al. | |
| 7,917,645 B2 | 3/2011 | Ikezoye et al. | |
| 8,006,314 B2 | 8/2011 | Wold | |
| 8,082,150 B2 | 12/2011 | Wold | |
| 8,086,445 B2 | 12/2011 | Wold et al. | |
| 8,401,904 B1 | 3/2013 | Simakov et al. | |
| 8,527,774 B2 | 9/2013 | Fallows et al. | |
| 8,583,643 B2 | 11/2013 | Kanefsky | |
| 8,978,075 B1 | 3/2015 | Kaiser et al. | |
| 9,661,380 B2 | 5/2017 | Major et al. | |
| 2004/0148424 A1* | 7/2004 | Berkson et al. | 709/236 |
| 2006/0174287 A1* | 8/2006 | Maeda | 725/80 |
| 2006/0222321 A1* | 10/2006 | Russ | 386/68 |
| 2006/0245625 A1 | 11/2006 | Tichelaar et al. | |
| 2007/0157266 A1 | 7/2007 | Ellis et al. | |
| 2009/0235313 A1* | 9/2009 | Maruyama | H04N 21/42201 725/46 |
| 2009/0288113 A1* | 11/2009 | Skinner | G06Q 30/02 725/32 |
| 2010/0169934 A1* | 7/2010 | Kennedy | 725/62 |
| 2011/0162002 A1 | 6/2011 | Jones et al. | |
| 2011/0289098 A1* | 11/2011 | Oztaskent et al. | 707/769 |
| 2011/0306368 A1 | 12/2011 | McCarthy | |
| 2012/0136701 A1 | 5/2012 | Relan et al. | |
| 2012/0144416 A1 | 6/2012 | Wetzer et al. | |
| 2012/0210216 A1 | 8/2012 | Hurst | |
| 2012/0240162 A1 | 9/2012 | Rose | |
| 2012/0240177 A1 | 9/2012 | Rose | |
| 2012/0311074 A1 | 12/2012 | Arini et al. | |
| 2013/0018936 A1 | 1/2013 | D'Amico et al. | |
| 2013/0347018 A1 | 12/2013 | Limp et al. | |
| 2014/0007155 A1* | 1/2014 | Vemparala et al. | 725/32 |
| 2014/0082651 A1 | 3/2014 | Sharifi | |
| 2014/0195557 A1 | 7/2014 | Oztaskent et al. | |
| 2014/0229975 A1* | 8/2014 | Bolden | H04N 21/4126 725/32 |
| 2014/0254806 A1 | 9/2014 | Fonseca, Jr. et al. | |
| 2014/0282667 A1 | 9/2014 | Major et al. | |
| 2014/0282693 A1 | 9/2014 | Soundararajan et al. | |
| 2014/0365299 A1 | 12/2014 | Barenzung et al. | |

OTHER PUBLICATIONS

USPTO, Office Action for U.S. Appl. No. 14/216,235 dated May 7, 2015.

USPTO, Final Office Action for U.S. Appl. No. 14/216,235 dated Aug. 25, 2015.

USPTO, Notice of Allowance and Fee(s) Due in U.S. Appl. No. 14/216,235 dated Jan. 25, 2017.

USPTO, Office Action in U.S. Appl. No. 15/600,334 dated Feb. 12, 2018.

USPTO Final Office Action, U.S. Appl. No. 14/216,235, dated May 31, 2016.

\* cited by examiner

PRE-DISTRIBUTION IDENTIFICATION OF BROADCAST TELEVISION CONTENT USING AUDIO FINGERPRINTS

TECHNICAL FIELD

The present disclosure generally relates to gathering data about broadcast television content. More particularly, the following discussion relates to the use of audio fingerprinting to identify advertisements or other portions of a broadcast television stream.

BACKGROUND

As television receivers, media players and other media playback devices become increasingly sophisticated, additional functions and features have been enabled. Modern television receivers, for example, are now capable of providing additional data to accompany television broadcast content, or of taking any number of useful actions to enhance the viewer's enjoyment of their television programming.

While it would be desirable to allow the television receiver to take enhanced actions based upon the content of the advertisements or other portions of the live broadcast, this can be very difficult to implement in practice. In particular, it can be very difficult for a cable, direct broadcast satellite (DBS) or other content distributor to know in advance when certain commercials will be run. Conventional electronic program guides, for example, typically provide information about programming schedules, channel lineups and the like, but do not typically include detailed information about the specific content components of the broadcast, particularly the timing and identities of commercials that may be present in the broadcast stream. Moreover, due to the nature of live broadcasting, it is not always possible to know in advance where the ads will be located, or what ads will be run. During a live broadcast of a sporting event, for example, it is very difficult to predict when the commercial breaks will occur, or even how many advertisements will run during the course of the program. Further, local affiliates often modify network schedules to provide different advertising in local markets. Without accurate identification of the content, it can be a substantial challenge for the content distributor to offer enhanced actions based upon the particular content of the stream.

It is therefore desirable to create systems, device and methods to reliably and quickly allow a content distributor to identify the specific contents of a particular television broadcast, such as the timing and content of advertisements. These and other desirable features and characteristics will become apparent from the subsequent detailed description and the appended claims, taken in conjunction with the accompanying drawings and this background section.

BRIEF SUMMARY

Various exemplary embodiments provide systems, devices and methods to identify portions of a broadcast television stream using audio fingerprinting techniques.

In some implementations, a data processing system operable by a cable, DBS or other television distributor monitors the audio content of a television broadcast as the broadcast is received. The data processing system generates audio fingerprints of the received content that are compared to previously-identified audio fingerprints to identify portions of the television broadcast. This allows the broadcast to be very carefully and accurately monitored so that advertisements or other portions of the broadcast can be readily identified. Moreover, this information can be determined prior to redistribution over a cable, DBS, IPTV or other medium. Accurate identification of the actual broadcast content prior to rebroadcast allows any number of useful actions to be taken based upon the content. Advertisements could be supplemented with additional content, live links, or other features, for example. Other embodiments could use the content identification information to skip or replace advertisements, to block fast forwarding through advertisements, or for any number of other uses.

These and other embodiments, aspects and features are described in detail below.

BRIEF DESCRIPTION OF THE DRAWING FIGURES

Figure 2:
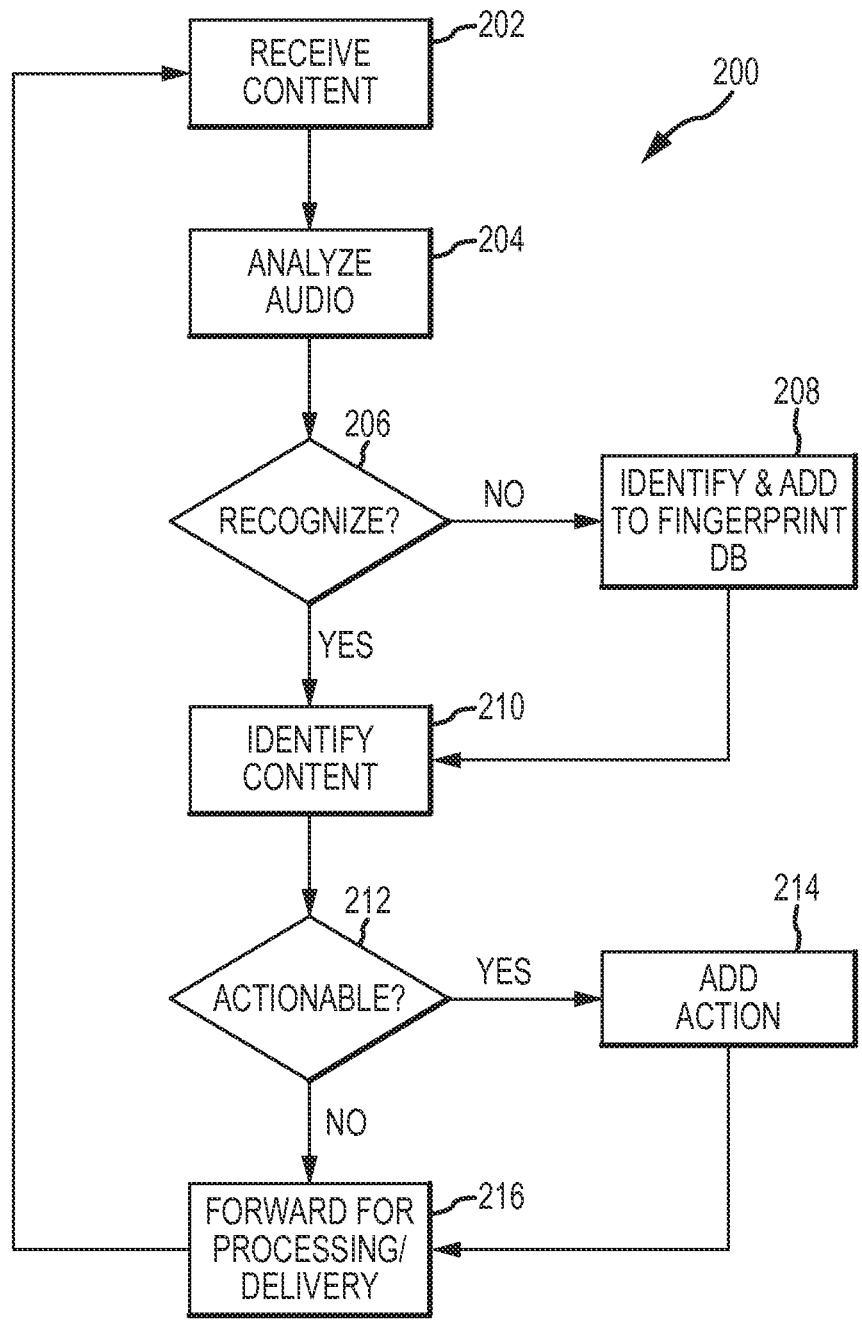
Figure 3:
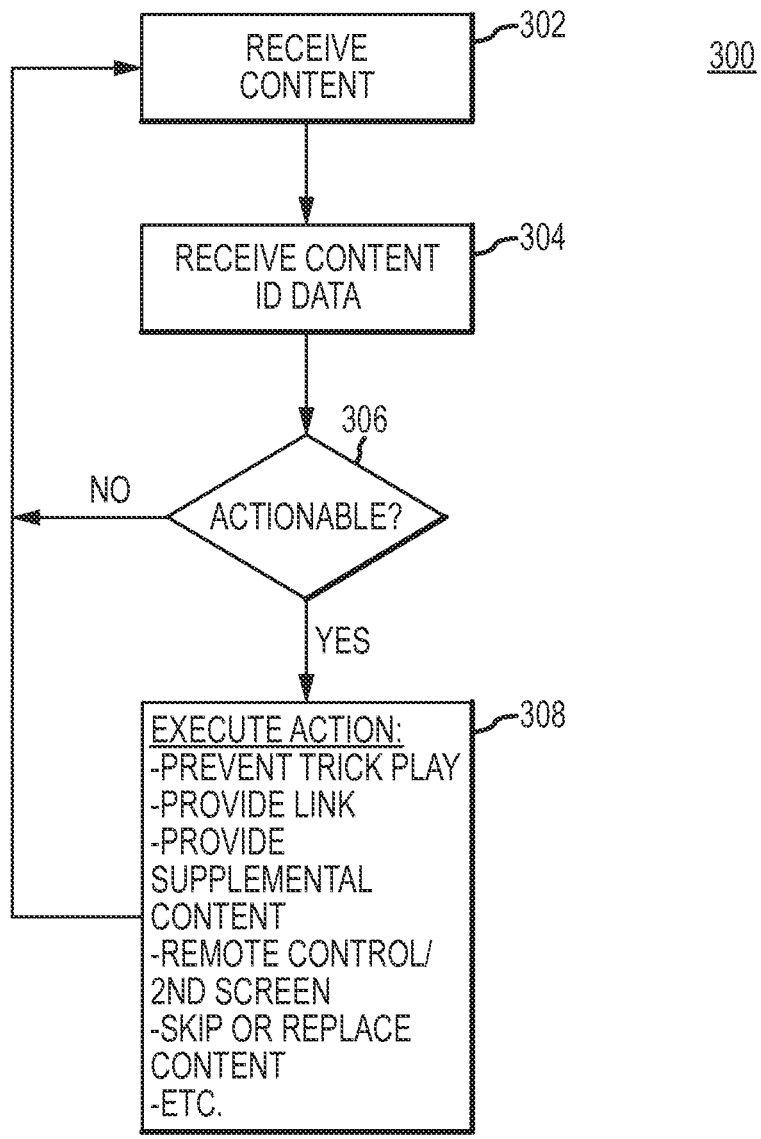

Exemplary embodiments will hereinafter be described in conjunction with the following drawing figures, wherein like numerals denote like elements, and FIG. 1 is a block diagram of one example of a system for gathering information about a broadcast media stream using audio fingerprinting;

FIG. 2 is a flowchart of an example method to identify portions of broadcast media content using audio fingerprinting; and FIG. 3 is a flowchart of an example method executable by a client device to process actionable content in a broadcast television stream.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, audio fingerprinting techniques are used to identify the specific contents of a television broadcast. Audio fingerprinting can effectively and quickly identify advertisements or other portions of the broadcast stream. Moreover, the identification can be performed by a content aggregator or distributor before the content is re-destributed to the end viewer, thereby allowing identification of the actually-broadcast content at a time when such information can still be used to enhance the viewer experience. This "just prior" identification by a content aggregator can be more reliable and more flexible than prior techniques that relied upon programming schedules or metadata in the program stream.

Further, rapid identification by the aggregator further allows any number of beneficial actions to be made based upon the program content. Advertisements or other content can be identified in real time as they are broadcast, for example. This information may be distributed viewers in real time to supplement the viewing of a live broadcast, as desired. Certain advertisements could be supplemented, for example, with links to purchase sites or to additional information about the product being advertised. Other embodiments could enable second screen applications (e.g., games or other features played on a smartphone, tablet, remote control or other device) related to the content that the viewer is watching. Still other embodiments could use the information obtained from the audio fingerprinting to skip over the ads in a broadcast, to prevent skipping over the ads (e.g., by disabling trick play while the ads are being broadcast), to replace the ads with other content, or to perform any other actions as desired. Moreover, the information obtained from the audio fingerprinting may be stored with content management data that can be shared with other services that might process the received content, such as placeshifting, timeshifting or the like. These and other examples are described more fully below.

Turning now to the drawing figures and with initial reference to FIG. 1, an exemplary data processing system 100 to identify and augment the contents of a broadcast television stream 110 suitably includes a receiver 101, an audio fingerprint system 140 that maintains a fingerprint database 145 and a content management system 130. Each of these components are typically provided by a content aggregator or distributor such as a cable television system operator, a direct broadcast satellite (DBS) system operator, a streaming media provider, or the like.

Broadcast television signals no for one or more networks, channels or the like are received by the system operator via satellite 123, fiber optic or any other conventional wireless or physical media for transmitting television signals. The signals are received, demodulated and decoded as needed by any appropriate receiver(s) 101 to extract program signals 111 that represent the decoded television program stream.

The extracted programming signals 111 are analyzed as appropriate to identify the program contents. In the embodiment of FIG. 1, the audio portions of the extracted signals are analyzed by an audio fingerprint system 140. Audio fingerprint system 140 is any computer system that is capable of extracting audio fingerprints from the decoded signals 111. To that end, fingerprint system 140 typically includes any conventional processor 141, memory 142 and input/output interfaces 143 that would be commonly found on a server or similar computer system to access networks, mass storage and/or the like. Fingerprint system 140 could be equivalently implemented using cloud-based computing resources, as desired.

In most embodiments, the fingerprint system 140 executes a software application 144 that performs the audio fingerprint analysis based upon average zero crossing rate, average spectrum, spectral flatness, prominent tones across a set of frequency bands, bandwidth and/or any other characteristics of the audio signal. Various examples of audio fingerprinting software are commercially available from Audible Magic Corporation of Los Gatos, Calif., and many others.

The extracted fingerprints may be compared to fingerprints previously stored in a database 145, as appropriate, to identify portions of content in the program stream. Commercials, for example, can be recognized when the audio portions of the program stream 111 contain similar fingerprints to known audio data stored in database 145. The fingerprints stored in database 145 may be obtained from human data entry (as described below), from a content source (e.g., an advertiser, broadcaster or network), or from any other source as desired. Database 145 may make use of conventional database software (e.g., database products available from Microsoft, IBM, Oracle or any other vendor), or the database 145 may be a custom database developed to store audio fingerprint data, as desired. Database 145 may reside on the same computing hardware as audio fingerprint system 140, or separate computing resources could be provided, including any sort of cloud-based computing resources.

Audio fingerprint system 140 is therefore able to identify advertisements or other contents of the received television broadcast 111 using audio fingerprinting. In many implementations, audio fingerprinting and content identification is performed in parallel for multiple channels that may be simultaneously received by the content aggregator for any other purpose. In addition to audio fingerprinting, for example, the distributor/aggregator may use the extracted signals 111 for encoding the signals 111 for distribution on a digital network, for aggregation and redistribution of signals 111 over a DBS or cable distribution system, for generating content stored on a remote storage digital video recorder (RSDVR) or video on demand (VOD) service, or for any other purpose.

In the example of FIG. 1, audio fingerprinting occurs in parallel with the encoding of the live broadcast signals 111 for adaptive streaming on a digital network 125. To that end, FIG. 1 shows an encoder 102 that encodes programs 104 contained within signals 111 into one or more adaptive streams 105A-C each representing a media program 104 in its entirety, but with different bit rates, frame rates, resolution and/or other levels of quality. Typically, each stream 105A-C is made up of smaller segments 106 that each represent a small portion of the program content with a single data file. Each stream 105A-C is typically encoded so that segments 106 of the different streams 105A-C are interchangeable with each other, often using a common timing index. This allows a client media player to mix and match segments 106 from different streams 105A-C to create a media stream that effectively adapts as network conditions or other conditions change. Other embodiments could use different encoding or streaming structures or techniques, as desired.

FIG. 1 shows sets of segments 106 making up each stream 105 being stored on a content delivery network (CDN) or other content source 107 for distribution on the Internet or another network 125 as part of an RSDVR, VOD or other media streaming service. Typically, a media player application executing on one or more playback devices 120 contains intelligent logic to select appropriate segments 106 as needed to obtain and playback the media program 104. Segments 106 may be interchangeable between streams 105 so that higher quality segments 106 are seamlessly intermixed with lower quality segments 106 to reflect changing network or other conditions in delivery over network 125. Since the segments 106 are typically stored as separate files, segment requests may take the form of conventional hypertext transport protocol (HTTP) constructs (e.g., HTTP "get" instructions) or the like. Such constructs are readily routable on network 125 and can be served by conventional CDN or other web-type servers 107, thereby providing a convenient mechanism for distributing adaptive media streams to a variety of different client devices on network 125.

Again, other embodiments may use different encoders 102 for encoding cable television signals, DBS signals, or the like; still other embodiments may omit the encoding function entirely and perform audio fingerprinting and recognition separately from the distribution function. Since many distributors already receive program signals 110 for encoding, however, there may be an economy of scale in performing the audio fingerprinting function at the same time.

Moreover, various embodiments may realize substantial benefits by integrating the identification information obtained from audio fingerprinting into content management data. As noted above, audio fingerprinting may be performed in real time as the program streams are received, thereby allowing for very rapid identification of then-current broadcast content. This information may be readily incorporated into electronic program guide (EPG) data or other content management data that is provided to the television receiver or other playback device.

Content management system 130 shown in FIG. 1 is a computer system that has any conventional processor 131, memory 132 and input/output interface 133 features commonly associated with data processing systems, including any sort of cloud-based resources. Many content aggregators currently use content management systems 130 to manage and distribute electronic program guide (EPG) data and other information about the programs that are distributed within system 100. These systems 130 may be expanded to process information relating to advertisements or other portions of the content stream, and/or to associate actions to be performed by the viewer and/or the playback device based upon the content of the stream.

FIG. 1 shows an example of data 150 that could be maintained by content management system 130. As shown in the figure, data 150 could include channel information 151 and timing information 152 about each entry so that the particular content can be readily identified. Other embodiments may use different identification data, such as distributor or network information, or any other information as desired. Although some implementations may incorporate conventional EPG data (e.g., data obtained from a vendor or other source), the example of FIG. 1 uses channel and time so that even portions of a program can be individually identified. Advertisements, for example, could be referenced by their channel and broadcast time so that additional actions unique to those advertisements could be enabled.

Data 150 as illustrated in FIG. 1 also includes description information 153 and/or action information 154. The description information 153 may simply describe the contents of an identified portion (e.g., "ad", "shoe ad", "action scene", "Battle for Helm's Deep", etc.) using text or any code. Since the information was obtained from the actual live broadcast itself, it will typically be very accurate in both timing and content, even if programming is delayed or otherwise modified from a predetermined schedule for any reason, and could be used to provide very accurate indexing through the broadcast, for example. Data 150 may also include action information 154 to separately trigger an action by the playback device, as described more fully below. A playback device could, for example, be programmed to offer a weblink to an online shoe retailer whenever a "shoe ad" is run, or to offer additional content, or to take any other action. Data 150 as shown in FIG. 1 is merely an example; other embodiments may be differently organized or encoded, and/or may represent description information 154 and action information 155 in any other manner.

Data 150 may be provided to any sort of media player, television receiver, network server or other recipient in any manner. In various embodiments, data 150 including information obtained from the audio fingerprinting is provided as part of EPG information delivered to set top boxes or other television receivers associated with cable, DBS or other distributors 126. Such information may be delivered using a batch delivery, when possible, or in real time (accounting for some delay inherent in data processing and transmission) as desired. Data 150 may also be provided to television receivers or other playback devices 120 via a network service such as content source 107 or a separate network server 122, as desired. Server 122 may be useful in, for example, providing the content information to a smart phone, tablet or other computer, video game player, remote control device or other "second screen" 127 that may be used by the viewer while he or she is also watching broadcast television. In various embodiments, data 150 could include action data 154 that triggers games, applications, weblinks or other features accessible using the second screen that are time coordinated to the advertisements or other programming that is currently viewed on a television or other display. Again, many other embodiments could incorporate any number of additional or alternate features to take advantage of the real-time identification feature provided by the broadcaster.

FIG. 2 provides additional detail about an exemplary process 200 executable by a data processing system operated by a content aggregator, distributor or the like to identify portions of a television broadcast using audio fingerprinting. The various functions shown in FIG. 2 may be implement using software that executes on audio fingerprint system 140, fingerprint database 145, content management system 130 or any other processing resources operating within system 100. The exemplary process 200 may be supplemented or modified to create any number of equivalent implementations.

Referring now to FIG. 2, broadcast television content is received (function 202) from the broadcaster, television network, or any other source, and the audio content of the received programming is analyzed (function 204) so that audio fingerprints of the content can be created. As noted above, the analysis may be performed in real time as the programming content is received. Alternatively, audio analysis could be performed on stored content, previously broadcast content, or any other content as desired. Audio analysis software 144 suitably processes the audio data to prepare appropriate fingerprints that can be compared to fingerprints of previously-encountered content that are stored in database 145 (function 206).

If a portion of the content has a fingerprint that cannot be identified from database 145, then alternate identification may occur (function 208). In various embodiments, the content is flagged so that a human operator can observe the unrecognized portion of the content stream. The first recognition process could be automated by using voice or image recognition, for example, or any other techniques as desired.

When the new content is recognized, then the newly-calculated fingerprint can be stored in database 145 so that the content will be recognized if it is rebroadcast. A television commercial, for example, may not be recognizable during its first broadcast, but after being recognized the computed fingerprint can be used to recognize rebroadcasts of the same ad.

When an audio fingerprint is recognized (function 210), then the portion of the broadcast content used to generate the fingerprint can be readily identified based upon information stored in database 145. An advertisement, for example, can be identified and tagged so that further processing based upon the advertisement is possible.

As noted above, real-time recognition enables any number of new actions that could be taken based upon the identified content. In some embodiments, the identification information is simply collected and used to tag the content, or used for any other purpose. Other implementations, however, may associate any number of different actions (function 212) with one or more identified portions of the content. If an advertiser has requested additional content to be associated with a particular ad, for example, then data 150 can be updated whenever the ad is broadcast to reflect that an actionable ad is occurring in the live stream (function 214). Actions may be tagged or otherwise triggered in any number of other ways.

The identification information 150 that is obtained from process 300 may be forwarded to content management system 130, servers 107 or 122, playback devices 120 and/or any other destinations as desired. Data 150 may be delivered via a cable or DBS broadcast system, for example, as batch or real-time out-of-band content similar to EPG data. Alternately, data 150 may be stored with the content itself, as in an RSDVR or VOD system, otherwise transmitted to a playback device 120 and/or second screen 127 via network 125 or in any other manner.

FIG. 3 shows additional detail about an exemplary process executable by a media player, television receiver or other playback device to process identified content in a television broadcast. The playback device receives the television broadcast stream (function 302) from a terrestrial or satellite broadcast, a cable television connection, or any other source.

The playback device also receives the information 150 identifying advertisements or other portions of the broadcast (function 304). As noted above, the information 150 may be provided with the broadcast content (e.g., as associated EPG data or otherwise via the same cable, DBS or other source), or may be obtained separately (e.g., from a server 107 or 122 on network 125).

The data 150 is monitored, as appropriate, to identify any actionable events that may occur during the viewer's programming (function 306). If an actionable item is identified on a channel and time that is being watched by the viewer, then the playback device suitably executes the requested action (function 308).

Several examples of actions that could be executed are described herein, and many others could be formulated across a wide array of alternate embodiments. Several examples are described here, but these examples are intended to be non-limiting.

In various embodiments, the data 150 identifies any commercials in the broadcast stream so that trick play (e.g., fast forward) can be disabled while the commercials are playing. To implement this, the playback device would simply refuse to execute a fast forward or similar instruction during the times of the broadcast that are identified as containing commercials. Trick play could also be disabled for only certain ads, as desired, so that only certain advertisers are allowed to prevent viewers from fast forwarding over their commercials. This concept could be expanded and/or commercialized in any number of ways.

Conversely, if the precise times of the commercials in a broadcast stream were identified using data 150, then playback device could use this timing information 152 to skip over the commercials entirely, or to replace the commercials with other content as desired. Such replacement could be used, for example, to replace an ad that is of low interest to the viewer with an ad that is of higher interest based upon demographic information or customer profile data available to the playback device.

In still other embodiments, the playback device could supplement the commercials with links and/or additional content. Since the advertisement is identified using audio content from the ad itself, the supplemental content could be readily linked to all of the ads belonging to a product class or relating to a particular advertiser, regardless of the time, network or channel that broadcasts the ad. This would allow, for example, a soda advertiser to supplement all of their ads with additional features on the playback device regardless of the content of the ad, the broadcast network, or the time of broadcast. A link to a retail site could be provided during an ad, for example, so the viewer could simply click on a button or execute a similar feature to purchase the advertised product. Additional content (e.g., a longer ad, a movie, a game or the like) could also be provided so if the viewer wanted more information about the advertised product, he or she would be able to obtain it immediately and conveniently. Further, additional content could be provided via a secondary device 127, as desired. The secondary device may receive information 150 in addition to or in place of the playback device, as desired for the particular application. Any other content could be provided in addition or in alternative to that described here, and such content could be provided in any manner. This could provide a significant benefit to advertisers, who may want to supplement their broadcast ads with additional content and/or to target their additional content toward certain viewers.

The foregoing discussion therefore considers various systems, devices and methods for real-time identification of advertisements or other portions television broadcasts using audio fingerprinting. By identifying advertisements or other portions of the content while the content is being encoded or aggregated for distribution, the content distributor is able to provide a variety of new features while retaining a high level of accuracy in identifying ads as they are actually broadcast. By capturing the identity of the ads at the initial point of ingestion, the content distributor is able to offer any number of useful new features and benefits.

The general concepts set forth herein may be adapted to any number of equivalent embodiments. Many other enhancements, modifications and other changes could be made in a wide array of alternate but equivalent embodiments.

The term "exemplary" is used herein to represent one example, instance or illustration that may have any number of alternates. Any implementation described herein as "exemplary" is not necessarily to be construed as preferred or advantageous over other implementations, nor is it necessarily intended as a model that must be duplicated in other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A data processing system to identify portions of television broadcasts received by a content aggregator prior to redistribution of the television broadcast by the content aggregator to a remotely-located client device, the data processing system comprising:

a database of previously-stored audio fingerprints;

an audio fingerprint system operated by the content aggregator in conjunction with the database of previously-stored audio fingerprints, wherein the audio fingerprint system is configured to analyze the television broadcasts received by the content aggregator prior to redistribution of the television broadcasts to the remotely-located client device and to identify a portion of the content provided in the television broadcasts received by the content aggregator based upon a comparison of an audio fingerprint of the television broadcast to the database of previously-stored audio fingerprints, wherein the identified portion of the content is a commercial that is a part of the television broadcast that is dedicated to advertising a particular product; and a content management system operated by the content aggregator that is configured to maintain information describing the commercials as portions of received television broadcasts that are identified by the audio fingerprint system and to provide the information describing the identified commercials as portions of the received television broadcast system to the remotely-located client device, wherein the information describing the identified commercials comprises at least a channel and time of the television broadcast and an action associated with the identified commercial to be performed upon playback of the commercial, wherein the information is transmitted to the remotely-located client device separately from the television broadcast as out-of-band data as part of an electronic program guide to thereby notify the remotely-located client device of the identified commercials and to thereby direct the remotely-located client device to execute the action associated with the identified commercial during playback of the identified commercial at the channel and time of the television broadcast indicated in the information transmitted as the out-of-band data.

2. The data processing system of claim 1 wherein the content management system is configured to notify the remotely-located client device of the identified commercial in real time as the remotely-located client device is receiving the television broadcast.

3. The data processing system of claim 1 wherein the action comprises providing additional information to a viewer of the remotely-located client device while the identified commercial is being presented by the remotely-located client device.

4. The data processing system of claim 1 wherein the action comprises prohibiting trick play while the identified portion of the television broadcast is being presented.

5. The data processing system of claim 1 wherein the action comprises replacing the identified portion of the television broadcast with other content.

6. The data processing system of claim 1 further comprising an encoder that encodes the received television broadcast into a media stream as the audio fingerprint system is analyzing the television broadcast.

7. A method executable by a data processing system associated with a content aggregator to automatically identify portions of a television broadcast received by the content aggregator prior to re-broadcast of the television broadcast to a remotely-located client device, the method comprising:
receiving the television broadcast at the data processing system associated with the content aggregator;
analyzing audio content of the received television broadcast to generate an audio fingerprint of a commercial, wherein the commercial is a portion of the received television broadcast that is dedicated to advertising a particular product;
comparing the generated audio fingerprint of the commercial to audio fingerprints previously stored in a database maintained by the content aggregator to thereby identify the commercial based on the generated audio fingerprint; and
providing information describing the identified commercial according to a broadcast time and channel from the content aggregator to the remotely-located client device as out-of-band data transmitted separately from the television broadcast as part of an electronic program guide, wherein the information describes an action to be performed by the remotely-located client device upon playback of the commercial portion of the television broadcast at the broadcast time and channel indicated in the information via the out-of-band data.

8. The method of claim 7 providing comprises notifying the remotely-located client device of the identified portion in real time as the remotely-located client device is receiving the television broadcast.

9. The method of claim 7 wherein the action comprises providing additional information to a viewer of the remotely-located client device while the identified commercial portion of the television broadcast is being presented by the remotely-located client device.

10. The method of claim 7 wherein the action comprises prohibiting trick play while the identified commercial is being presented.

11. The method of claim 7 wherein the action comprises replacing the commercial with another commercial.

12. The method of claim 7 wherein the action comprises skipping over the commercial during playback.

13. The method of claim 7 wherein the content aggregator is a digital broadcast satellite operator.

14. The method of claim 7 further comprising the data processing system simultaneously performing the receiving and analyzing for a plurality of television broadcasts on a plurality of different television channels.

15. The method of claim 7 further comprising the data processing system simultaneously performing the receiving and analyzing for a plurality of television broadcasts on a plurality of different television channels prior to re-broadcast of the plurality of television channels by the content aggregator.

16. The method of claim 7 further comprising the data processing system simultaneously performing the receiving and analyzing for a plurality of television broadcasts prior to re-broadcast of a plurality of television channels by the content aggregator, and wherein the method further comprises maintaining, by the data processing system, a database listing each broadcast of each commercial on all of the television channels.

* * * * *